(12) United States Patent
Meng et al.

(10) Patent No.: US 7,658,499 B2
(45) Date of Patent: Feb. 9, 2010

(54) PROJECTOR WITH A LINEARLY ADJUSTABLE ZOOM PROJECTION LENS

(75) Inventors: Chi-Yu Meng, Miao Li County (TW); Jung-Chi Chen, Taipei Hsien (TW)

(73) Assignee: Coretronic Corporation, Chu Nan (TW)

( * ) Notice: Subject to any disclaimer, the term of this patent is extended or adjusted under 35 U.S.C. 154(b) by 533 days.

(21) Appl. No.: 11/515,893

(22) Filed: Sep. 6, 2006

(65) Prior Publication Data

US 2007/0064205 A1 Mar. 22, 2007

(30) Foreign Application Priority Data

Sep. 16, 2005 (TW) ............................... 94132147 A

(51) Int. Cl.
*G03B 21/14* (2006.01)
*G03B 3/00* (2006.01)
*G03B 21/22* (2006.01)
*G02B 15/14* (2006.01)
*G02B 7/02* (2006.01)

(52) U.S. Cl. .................. 353/101; 353/100; 353/119; 359/694; 359/701; 359/825

(58) Field of Classification Search .................. 353/69, 353/100–101, 119; 359/354, 676, 694, 701, 359/700, 703, 706, 819, 822–823, 825, 830; 396/72, 76, 79, 83, 119; 355/44, 55; 348/345, 348/375
See application file for complete search history.

(56) References Cited

U.S. PATENT DOCUMENTS

| 4,103,993 | A  | * | 8/1978 | Winkler et al. | ............... | 352/140 |
| 6,933,987 | B2 | * | 8/2005 | Menard | ...................... | 348/745 |
| 7,246,908 | B2 | * | 7/2007 | Salvatori et al. | ............ | 353/101 |
| 7,354,161 | B2 | * | 4/2008 | Kuroda | ....................... | 359/823 |
| 7,454,132 | B2 | * | 11/2008 | Oya | ........................... | 396/83 |
| 2003/0164926 | A1 | * | 9/2003 | Nakano et al. | ................ | 353/31 |
| 2006/0164610 | A1 | * | 7/2006 | Yoshikawa | .................. | 353/101 |
| 2006/0251412 | A1 | * | 11/2006 | Liu | ............................. | 396/72 |
| 2006/0256303 | A1 | * | 11/2006 | Hamada | ..................... | 353/101 |
| 2008/0180639 | A1 | * | 7/2008 | Amano et al. | ................. | 353/24 |

FOREIGN PATENT DOCUMENTS

| JP | 2003-43583 A | 2/2003 |
| TW | 200428130 A | 12/2004 |

* cited by examiner

*Primary Examiner*—Georgia Y Epps
*Assistant Examiner*—Jori S Byrne-Diakun
(74) *Attorney, Agent, or Firm*—Birch, Stewart, Kolasch & Birch, LLP

(57) ABSTRACT

A projector has a case, a zoom lens, a zoom ring, a control plate, a lodging element, a control rod, and a handle. The case has an opening, and the zoom ring is disposed within the case and nearby the opening, the zoom ring is moved back and forth to drive the zoom rod. The control plate is mounted on the case and laid over the opening movably, the lodging element is movably contacted with the control rod, wherein the handle accepts the force along the extending direction of the rectangular opening so as to let the control plate move the lodging element along the extending direction of the rectangular opening and further to move the control rod for continuously regulating the focal length of the zoom lens.

10 Claims, 6 Drawing Sheets

PROJECTOR WITH A LINEARLY ADJUSTABLE ZOOM PROJECTION LENS

BACKGROUND OF THE INVENTION (1) Field of the Invention

The present invention generally relates to a projector, more particularly to a projector with a means of controlling the focal length of a zoom lens.

(2) Description of the Prior Art

Please refer to FIG. 1 and FIG. 2, which show a conventional projector 2. The conventional projector 2 has a zoom lens 8, a front end of a case 4 of the projector 2 has a hole, and the zoom lens 8 of the projector 2 extends toward outside the projector 2 from an interior of the case 4 via the hole.

A zoom rod 802 extends upward from a lateral of a column of the zoom lens 8. To move the zoom rod 802 is able to regulate the movement of a zoom lens set (not shown in figures) of the zoom lens 8 in order to adjust the focal length of the zoom lens 8.

A rectangular opening 402 is disposed on an upper surface of the case 4, wherein two long sides of the opening 402 extend and are parallel to two long sides of the case 4. An interior arc surface of a zoom ring 6 female-connects to a cylindrical lateral of the zoom lens 8, and the zoom ring 6 is disposed between the opening 402 and the zoom lens 8.

The interior the arc surface of the zoom ring 6 further has a groove, and a zoom rod 802 reciprocates along the groove. The zoom rod 802 is moved by moving the zoom ring 6 along the arc surface thereof in order to regulate the focal length of the zoom lens 8.

Furthermore, a handle 602 is disposed on an upper surface of the zoom ring 6, and passes through the opening 402 so as to reach an outside of the projector 2. Hence, a user changes the focal length of the zoom lens 8 by moving the handle 602 simply.

However, the opening 402 is shielded by the arc surface of the zoom ring 6, and there is a chink existed between an even surface of the case 4 and the arc surface of the zoom ring 6. The light in the projector 2 is leaked out and dust is deposited into the projector 2 from the chink. Hence, problems, such as light leakage and dust contamination occur.

Additionally, the handle 602 moves along the arc surface and passes through the opening 402. The handle 602 is fully extended out of the opening 402 when the handle 602 is moved at a middle of the opening 402, and the handle 602 is partly extending out of the opening when the handle 602 is moved at two ends of the opening 402. So that the handle 602 is not easy to operate for a user.

SUMMARY OF THE INVENTION

An objective of the present invention is to providing a projector with a means of controlling the focal length of a zoom lens a projector, which is capable of preventing disadvantages of light leakage and dust contaminant. In addition, the appearances of an opening and a handle seem to be ingenious.

The projector has a case, a zoom lens, a zoom ring, and a control plate. The case has an opening, which is disposed on an upper surface of the case and extended along two long sides of the case.

The zoom lens is passed through a hole of the case and extended toward outside. A zoom rod is extended from one lateral of a column of the zoom lens, and moving the zoom rod is able to regulate the focal length of the zoom lens.

A zoom ring is disposed within the case and nearby the opening. The zoom ring has an arc surface, an interior of the arc surface is female-contacted with the lateral of the column, a groove is provided in the interior of the arc surface to cooperate with the zoom rod. The zoom ring is moved back and forth along the arc surface to drive the zoom rod. A control rod is disposed on an exterior of the arc surface, the opening is elongated along the arc surface and a rectangular form.

The control plate is mounted on the case and laid over the opening movably, the control plate moves back and forth along two long sides of the opening and is attached to an inner surface or an outer surface of the case. A lodging element is provided on one side of the control plate, and movably contacted with the control rod. A handle is provided on another side of the control plate and extended outside the surface of the projector.

The handle accepts the force along the extending direction of the rectangular opening so as to let the control plate move the lodging element along the extending direction of the rectangular opening and further to the control rod for continuously regulating the focal length of the zoom lens.

Therefore, by means of the projector with the means of controlling the focal length of the zoom lens, the design of the control plate movably connecting to the case and laying over the opening, and the further movable connected to the control plate and the zoom ring. The problems as light leakage and dust contamination are avoided, and the appearances of the opening and the handle are seem to be more ingenious.

These and other objectives of the present invention will no doubt become obvious to those of ordinary skill in the art after reading the following detailed description of the preferred embodiment which is illustrated in the various figures and drawings.

BRIEF DESCRIPTION OF THE DRAWINGS

The present invention will now be specified with reference to its preferred embodiment illustrated in the drawings, in which FIG. 1 illustrates a schematic front view of a structure controlling the focal length of a zoom lens of a projector in prior arts;

FIG. 2 illustrates a schematic exploded view of the structure in FIG. 1;

FIG. 3 illustrates a schematic front view of a structure controlling the focal length of a zoom lens of a projector of the present invention;

FIG. 4 illustrates a schematic view of a first preferred embodiment of the projector of the present invention;

FIG. 5 illustrates a schematic exploded view of the first preferred embodiment of the projector of the present invention;

FIG. 6 illustrates a schematic view of a movable connection of a control plate and a case of the first preferred embodiment of the present invention;

FIG. 7 illustrates a schematic exploded view of the second preferred embodiment of the projector of the present invention; and FIG. 8 illustrates a schematic view of a movable connection of a control plate and a case of the second preferred embodiment of the present invention.

DESCRIPTION OF THE PREFERRED EMBODIMENT

Please refer to FIG. 3, which illustrates a structure of a controlling the focal length of a zoom lens of the projector of the present invention. The structure has a zoom ring 42 and a control plate 40. A zoom rod is extended from a lateral of a column of a zoom lens 44 for regulating the focal length of the zoom lens 44. The zoom rod may move the zoom lenses set (not shown) within the zoom lens 44 back and forth to change the different focal lengths. An interior arc surface of the zoom ring 42 female-connects to a cylindrical lateral of the zoom lens 44. A groove is provided on the interior arc surface for holding the zoom rod, and the zoom ring 42 moves back and forth along the extending direction of the arc surface to control the zoom rod. A control rod 4202 is disposed on the control plate 40, which is mounted on a case of the projector and nearby the exterior of the arc surface of the zoom ring 42, and laid over an opening accordingly. A lodging element 4004 is provided on one side of the control plate 40 and a control rod 4202 is disposed outside the arc surface, and the lodging element 4004 movably contacts with the control rod 4202. A handle 4002 is provided on another side of the control plate 40 and extended outside the surface of the projector. The handle 4002 accepts a force along the extending direction of the rectangular opening so as to let the control plate 40 move the lodging element 4004 along the extending direction of the rectangular opening and further to the control rod 4202 for continuously regulating the focal length of the zoom lens 44.

Figure 1:
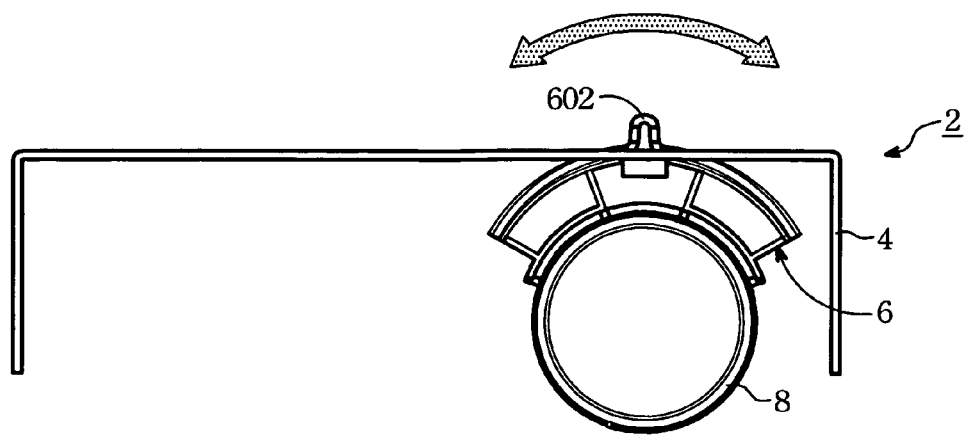
Figure 2:
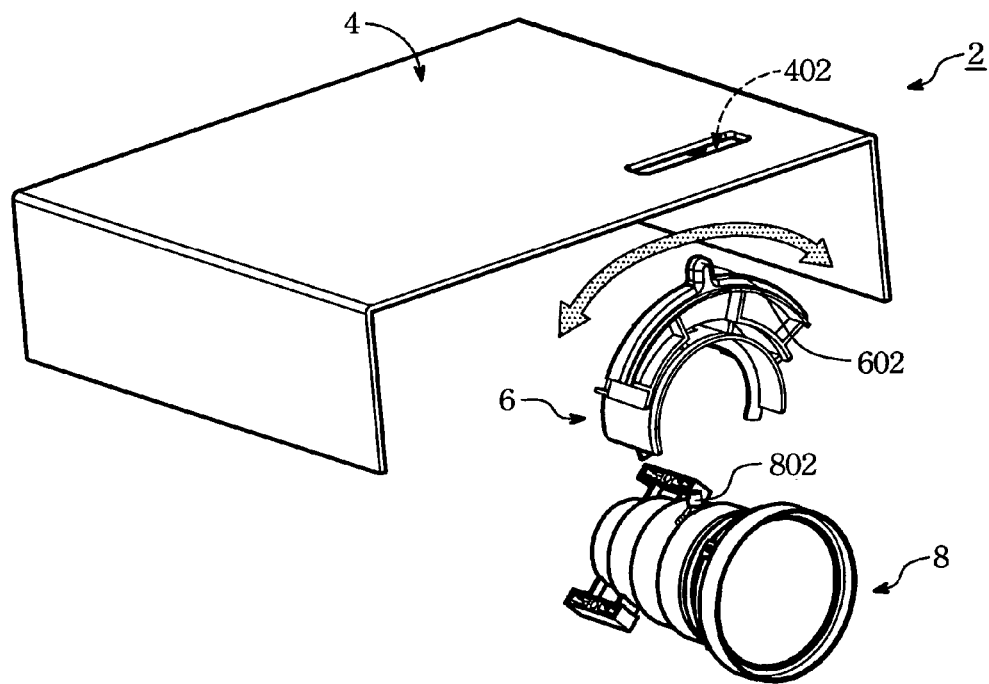
Figure 3:
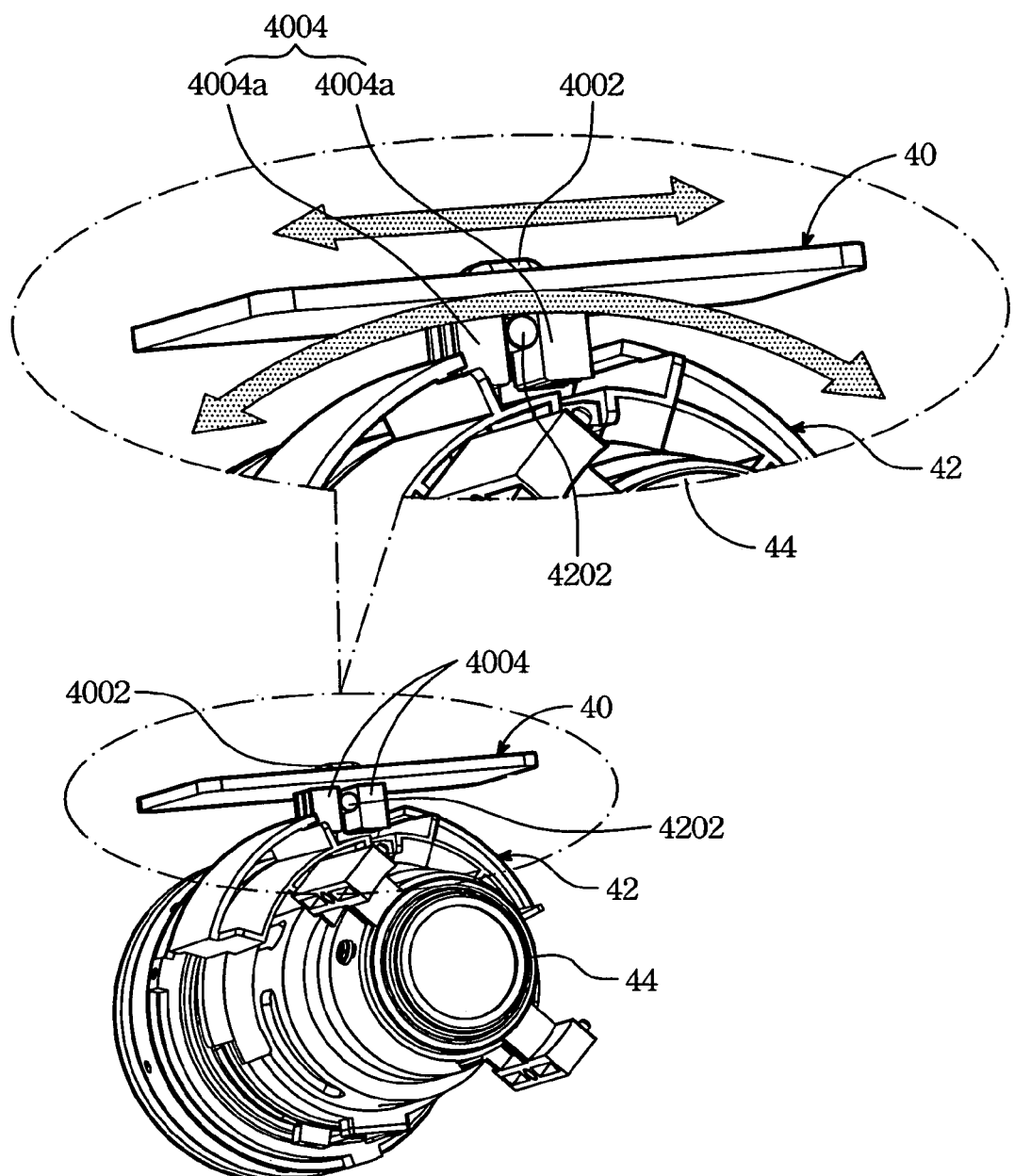

Additionally, the lodging element 4004 has two parallel barricades 4004a extending toward the outside. As shown in FIG. 3, the control rod 4202 tangentially extends from a peripheral of the arc surface of the zoom ring 42, further that, the control rod 4202 traverses and is orthogonal to the arc surface of the zoom ring 42, the control rod 4202 is a cylinder and traversed between two barricades 4004a so as to let the lodging element 4004 movably contact with the control rod 4202. That is, the control rod 4202 is inserted between two barricades 4004a so as to let the two parallel barricades 4004a movably contact with the control rod 4202.

Many embodiments of the present invention are provided for the connection of the control plate 40 and the opening of the case. Following the below embodiment further understand the structure of controlling the focal length of the zoom lens 44 of the projector.

Figure 4:
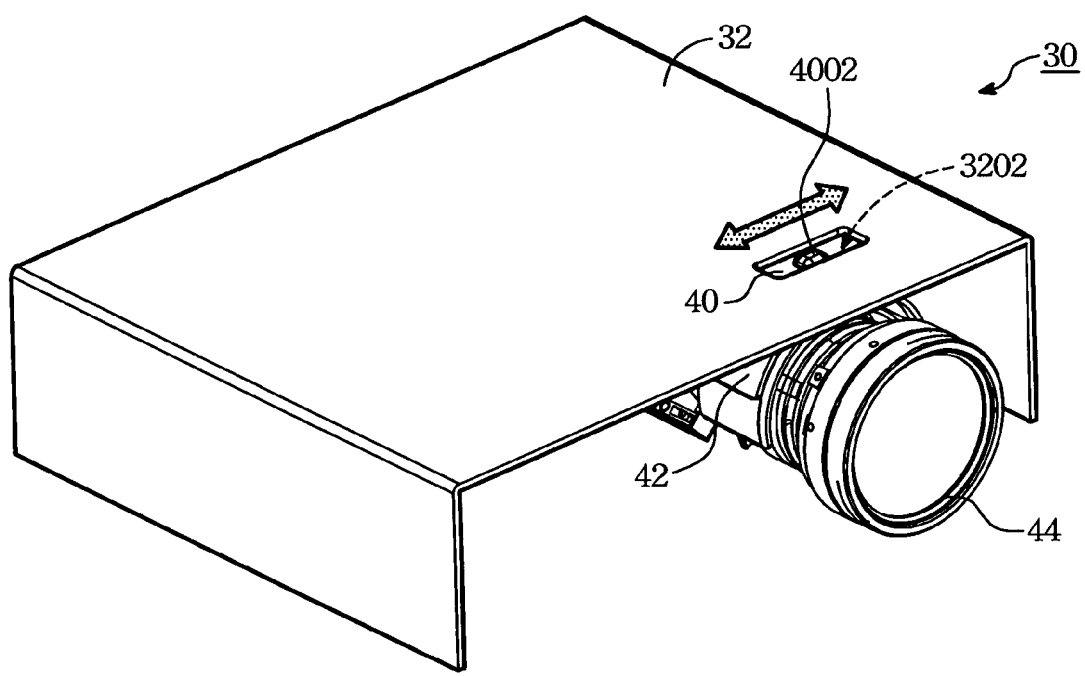
Figure 5:
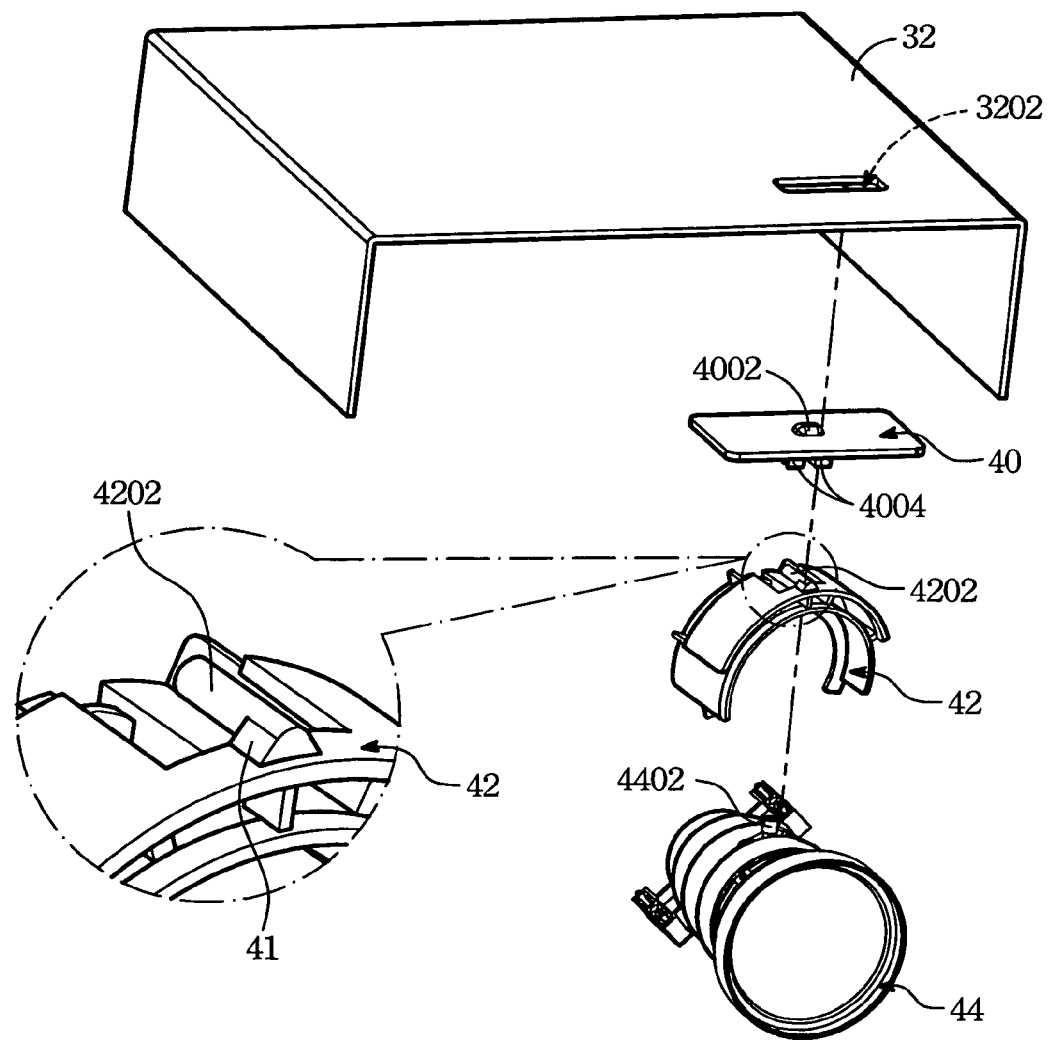

Please refer to FIGS. 4-5, which illustrate a schematic view of a first preferred embodiment of the projector 30 of the present invention. The projector 30 has a case 32 and a rectangular opening 3202 disposed on the case 32. The rectangular opening 3202 is extended along two long sides of the case 32. The zoom lens 44 extends toward an outside of the projector through a hole of a front end of the case 32. The zoom ring 42 female-connects to an upper lateral surface of the column of the zoom lens 44 and is disposed between the opening 3202 and the zoom lens 44.

Please refer to FIG. 5, which presents how the control rod 4202 is disposed. A protruding member 41 vertically extends from a peripheral of the arc surface of the zoom ring 42. The protruding member 41 traverses and is tangentially to the arc surface of the zoom ring 42 and extended to the control rod 4202, the control rod 4202 is a cylinder and traversed between the two barricades 4004a so as to let the lodging element 4004 movably contact with the control rod 4202. That is, the control rod 4202 is inserted between two barricades 4004a so as to let the two parallel barricades 4004a movably contact with the control rod 4202. Further, FIG. 5 presents how the zoom rod 4402 is disposed.

Figure 6:
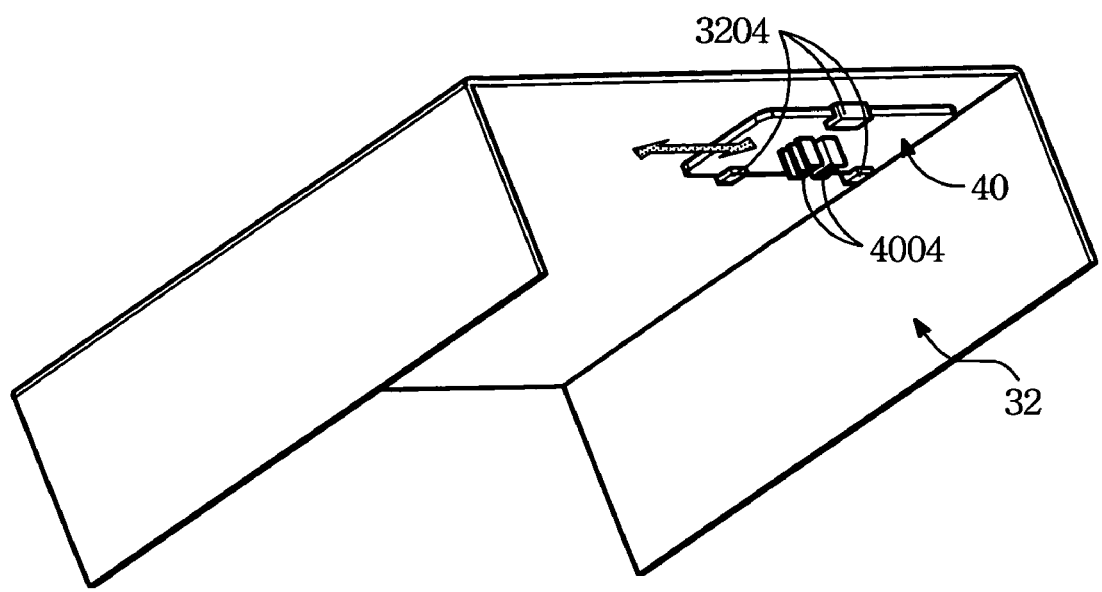

Please refer to FIG. 6, two tracks 3204 are disposed on two different sides of the opening 3202 respectively along two long sides of the rectangular opening 3202, two opposite laterals of the control plate 40 are provided to cooperate with the tracks 3204 to be attached the control plate 40 to the case 32 so as to lay over the opening 3202 from the outside of the case 32 so as to let the control plate 40 move along the tracks 3204.

A lodging element 4004 is provided on a lower lateral of the control plate 40, and movably contacted with the control rod 4202, a handle 4002 is provided on an upper lateral of the control plate 40 and extended to the outside of the projector 30 via the opening 3202.

Therefore, the handle 4002 accepts the force along the extending direction of the rectangular opening 3202 so as to let the control plate 40 move the lodging element 4004 along the extending direction of the rectangular opening 3202 and further to the control rod 4202 and the zoom ring 42 moved along the extending direction of the arc surface for continuously regulating the focal length of the zoom lens 44.

Figure 7:
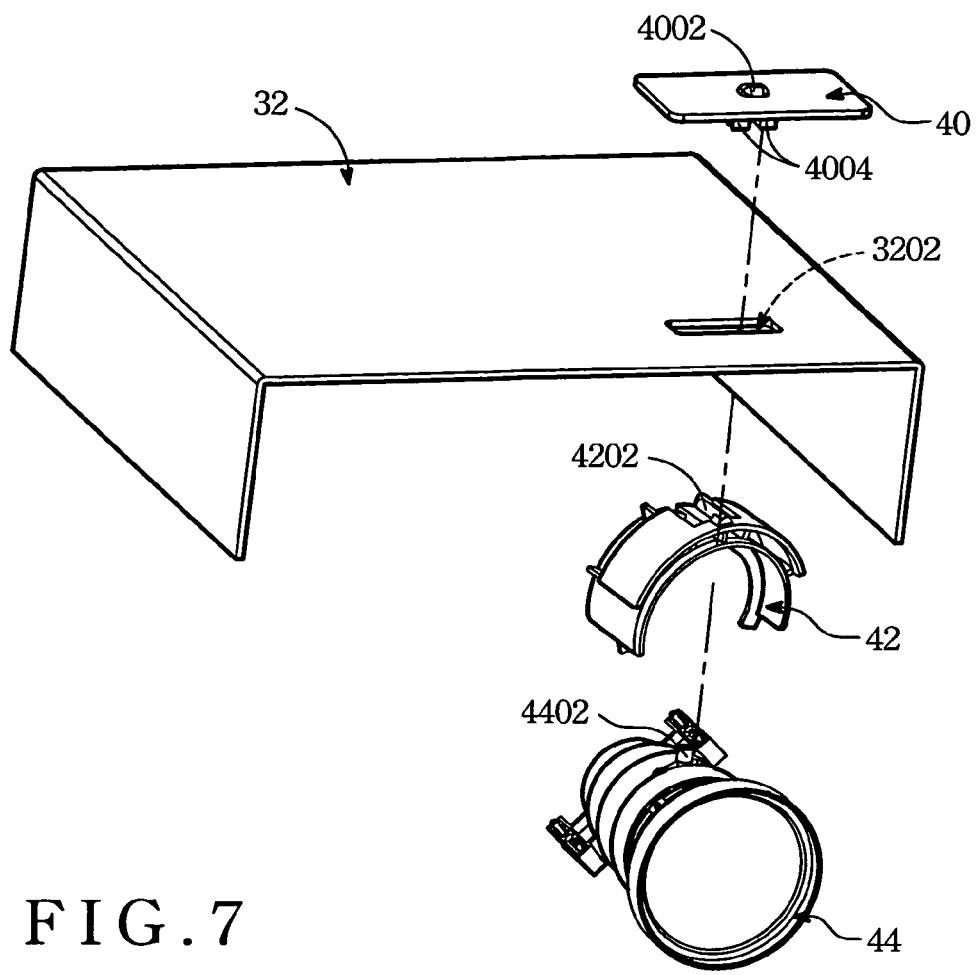
Figure 8:
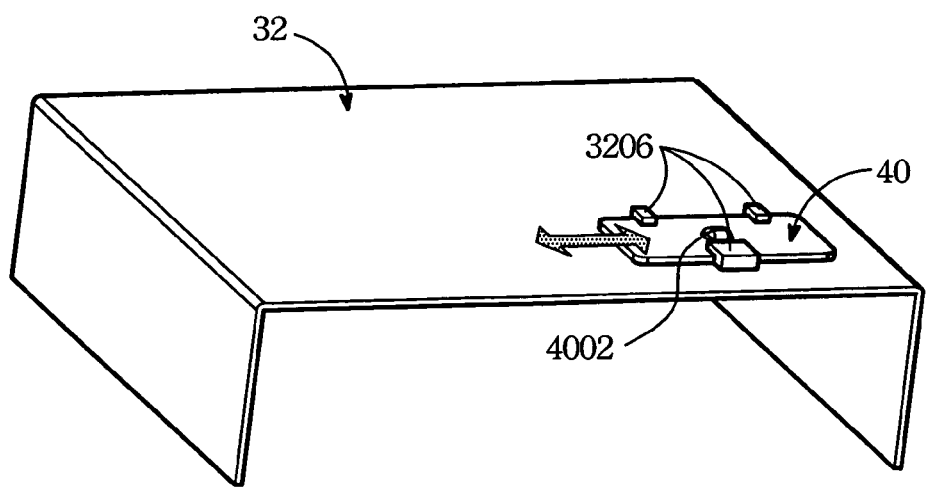

Please refer to FIGS. 7-8, which illustrate a schematic view of the projector 30 according to a second preferred embodiment of the present invention. The only difference between the second preferred embodiment and the first preferred embodiment is that the control plate 40 attaches to the case 32 from an exterior of the case 32 in order to lay over the opening 3202.

The two tracks 3206 are disposed on the two different sides of the opening 3202 respectively along the two long sides of the rectangular opening 3202. The two opposite laterals of the control plate 40 are provided to cooperate with the tracks 3206 for attaching to the case 32 so as to lay over the opening 3202 from the outside of the case 32 so as to let the control plate 40 move along the tracks 3206. The lodging element 4004 extends into the case 32 from the outside of the case 32 through the opening 3202 so as to movably connect to the control rod 4202. Further, FIG. 5 presents how the zoom rod 4402 is disposed.

Therefore, by means of the projector 30 with the means controlling the focal length of the zoom lens and the design of the control plate 40 movably connecting to the case 32, laying over the opening 3202, and the further movable connected to the control plate 40 and the zoom ring 42, the problems as light leakage and dust contamination are avoided, and the appearances of the opening 3202 and the handle 4002 are seem to be more ingenious.

With the example and explanations above, the features and spirits of the invention are hopefully well described. Those skilled in the art will readily observe that numerous modifications and alterations of the device may be made while retaining the teaching of the invention. Accordingly, the above disclosure should be construed as limited only by the metes and bounds of the appended claims.

We claim:

1. A projector, comprising:
   a case, having an opening provided thereon;
   a zoom lens passed through a hole of the case and extended toward outside, the zoom lens having a zoom rod extended from one lateral of a column of the zoom lens, and moving the zoom rod being able to regulate a focal length of the zoom lens;
   a zoom ring disposed within the case and nearby the opening, the zoom ring having an arc surface, an interior of the arc surface female-contacted with the lateral of the column, a groove provided in an interior of the arc surface to cooperate with the zoom rod, the zoom ring moved back and forth along the arc surface to control the zoom rod, a control rod disposed on an exterior of the arc surface, the opening elongated along the arc surface and a rectangular form; and
   a control plate mounted on the case and laid over the opening movably, a lodging element provided on one side of the control plate, and movably contacted with the control rod, a handle provided on another side of the control plate and extended outside the surface of the projector, wherein the handle accepts the force along the extending direction of the opening of rectangular shape so as to let the control plate move the lodging element along the extending direction of the opening of rectangular shape and further to move the control rod for continuously regulating the focal length of the zoom lens.

2. The projector of claim 1, wherein two tracks are disposed on two different sides of the opening respectively along two long sides of the rectangular opening, two opposite laterals of the control plate are provided to cooperate with the tracks for attaching the case so as to lay over the opening from the outside of the case so as to let the control plate move along the tracks, the lodging element extends into the case from the outside of the case to contact with the control rod movably.

3. The projector of claim 1, wherein two tracks are disposed on two different sides of the opening respectively along two long sides of the rectangular opening, two opposite laterals of the control plate are provided to cooperate with the tracks for attaching the case so as to lay over the opening from the outside of the case so as to let the control plate move along the tracks, the handle extends to the outside of the case from an inside of the case through the opening.

4. The projector of claim 1, wherein the opening is provided on an upper surface of the case.

5. The projector of claim 4, wherein the zoom ring female-connects to an upper lateral surface of the column of the zoom lens and is sandwiched between the opening and the zoom lens.

6. The projector of claim 5, wherein the lodging element of the control plate extends downward, and the handle extends upward.

7. The projector of claim 1, wherein the zoom lens extends toward a front exterior of the projector through the hole, the extending direction of the arc surface of the zoom ring and the extending direction of the long sides of the opening extending are both along the two long sides of the case, a zoom lens set of the zoom lenses moves along the zoom lens back and forth.

8. The projector of claim 1, wherein the lodging element comprises two parallel barricades extending toward outside.

9. The projector of claim 8, wherein a protruding member vertically extends from a peripheral of the arc surface of the zoom ring, the protruding member traverses and is orthogonal to the arc surface of the zoom ring and extended to the control rod, the control rod is a cylinder and traversed between two barricades so as to let the lodging element movably contact with the control rod.

10. A projector, comprising:
a case, an opening provided thereon;
a zoom lens having a zoom rod, the zoom rod extended from one lateral of a column of the zoom lens, being capable of regulating the focal length of the zoom lens;
a zoom ring having an arc surface, an interior of the arc surface female-contacted with the lateral of the column, a groove provided in the interior of the arc surface to cooperate with the zoom rod, a control rod disposed on an exterior of the arc surface; and
a control plate mounted on the case and laid over the opening accordingly, a lodging element provided on one side of the control plate, and movably contacted with the control rod, a handle being provided on another side of the control plate and capable of moving along the extending direction of long sides of the opening of rectangular shape so as to control the control rod and the zoom rod for regulating the focal length of the zoom lens.

* * * * *